Patented Feb. 13, 1951

2,541,623

UNITED STATES PATENT OFFICE 2,541,623

DYESTUFFS OF THE ANTHRAQUINONE SERIES AND A PROCESS FOR THEIR MANUFACTURE

Samuel von Allmen and Hans Eggenberger, Basel, Switzerland, assignors to Sandoz Ltd., Basel, Switzerland, a Swiss firm No Drawing. Application August 19, 1947, Serial No. 769,520. In Switzerland July 16, 1943

10 Claims. (Cl. 260—372)

1

The present invention is a continuation-in-part application of our co-pending patent application Ser. No. 541,287, filed on June 20, 1944 (now abandoned).

In the said patent application Ser. No. 541,287, there are described new anthraquinone dyestuffs corresponding to the general formula

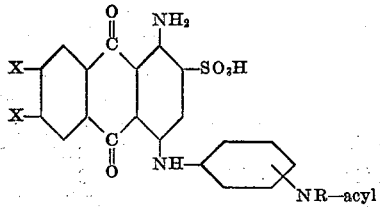

wherein one X stands for a sulfonic acid group, the other X being a hydrogen atom and in which the phenyl nucleus can contain substituents selected from the group consisting of halogen, alkyl and carboxy, and wherein R stands for hydrogen or alkyl.

As monoacylphenylene diamines used for the production of the above dyestuffs the following compounds have been mentioned in our co-pending patent application: p-aminoacetanilide, m-aminoacetanilide, p-aminomethylacetanilide, 3-acetylamino-p-toluidine, 3-acetylamino-2:4-dimethylaniline, 2-acetylamino-4-aminobenzoic acid methyl ester, 3-acetylamino-4-chloraniline, 2:6-dimethyl-3-acetylaminoaniline.

It has now been found that compounds of the above formula, wherein "acyl" means an aromatic radical, are very valuable new anthraquinone dyestuffs.

Therefore, the main object of the present invention is a method for the production of new anthraquinone dyestuffs, this method consisting in condensing anthraquinone compounds of the general formula

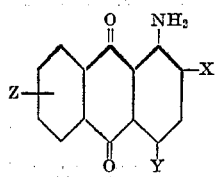

wherein

X means halogen or a sulfo group
Y means halogen and
Z means hydrogen or a sulfo group

2 with aromatic amines of the general formula

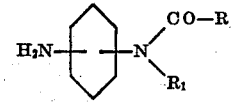

wherein

R means an aryl nucleus and
$R_1$ means hydrogen or alkyl, and in the case where X means a halogen atom, the latter is replaced by a sulfo group in the usual manner.

Further, the present invention is primarily directed to new anthraquinone compounds of the general formula

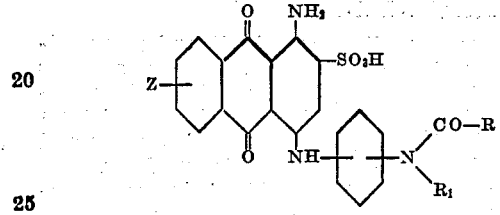

wherein Z, R and $R_1$ have the above mentioned meanings. The new dyestuffs of the present invention dye animal fibres in blue shades possessing good fastness properties to light and in the moist state and differing from the dyestuffs disclosed in the Swiss Patent 150,808 and in the U. S. Patent 1,927,125 in that the former possess largely improved fulling fastness properties.

As aroylated aromatic amino compounds used for the production of the new dyestuffs may be enumerated for instance: o-, m-, p-benzoylaminoaniline, o-, m-, p-(o'-chlorobenzoylmethylamino)-aniline, o-, m-, p-(p'-toluyl-ethylamino)-aniline, o-, m-, p-(m'-phenyl-benzoyl-butylamino)-m-, -p-, -o-toluidine, o-, m-, p-benzoylamino-m, -p-, -o-chloraniline and the like.

The following examples, in which the parts are by weight, illustrate the present invention without limiting it. Of course, the quantities of amine, alkali, catalyst and solvent may vary to a large extent.

Example 1

12 parts of the sodium salt of 1-amino-4-bromanthraquinone-2:6-disulfonic acid, 10.6 parts of p-benzoylamino-aniline, 10 parts of sodium bicarbonate, 0.1 part of copper bronze and 0.3 part of cuprous chloride are suspended in 200 parts of water and heated for 3 hours under stirring to 70° C.

The condensation mass having become blue is worked up in the usual way and, after drying, a blue dyestuff powder will be obtained which dissolves in water with a vivid greenish-blue coloration. Its solution in conc. sulfuric acid is almost colorless, but on addition of small quantities of paraformaldehyde there occurs a change of color into blue-green.

The new dyestuff dyes wool, silk and other animal fibres as well as artificial fibres, e. g. nylon, in beautiful greenish-blue shades of excellent fastness properties to light, washing, perspiration and to fulling.

A similar dyestuff will be produced, if, instead of the sodium salt of 1-amino-4-bromanthraquinone-2:6-disulfonic acid, the sodium or potassium salt of the corresponding 2:5-, 2:7- or 2:8-disulfonic acid or any other salt of the said acids are used. The 2:5-isomeric compound is a green dyestuff powder.

*Example 2*

13 parts of the potassium salt of 1-amino-4-bromanthraquinone-2:8-disulfonic acid, 12 parts of p-benzoylamino-m-toluidine, 10 parts of sodium bicarbonate, 0.1 part of copper bronze and 0.3 part of cuprous chloride are suspended in 200 parts of water and heated under stirring for 3 hours to 70° C.

The condensation mass having become blue in color is worked up in the usual manner, whereupon, after drying, a blue dyestuff powder dissolving in water with a vivid blue coloration is obtained. Its solution in conc. sulfuric acid is almost colorless, while, on addition of small quantities of paraformaldehyde, there will be produced a blue-green coloration.

The new dyestuff dyes wool, silk and other animal fibres as well as artificial fibres, such as nylon, in beautiful blue shades. The dyeings produced with this dyestuff are distinguished by a very good lightfastness, a very good washing and perspiration fastness and good fulling fastness.

A similar dyestuff is obtained, by using, instead of the potassium salt of 1-amino-4-bromanthraquinone-2:8-disulfonic acid, the potassium or sodium salt of the corresponding 2:5-, 2:6- or 2:7-disulfonic acid or the free acids thereof.

*Example 3*

16 parts of the potassium salt of 1-amino-4-bromanthraquinone-2:5-disulfonic acid, 9 parts of p-benzoyl-methylaminoaniline, 10 parts of sodium bicarbonate, 0.1 part of copper bronze and 0.3 part of cuprous chloride are suspended in 50 parts of alcohol and 150 parts of water, whereupon the mass is heated under stirring for 6 hours up to 70° C.

The resultant blue condensation mass is worked up in the usual manner and yields, after drying, a blue dyestuff powder dissolving in water with a vivid blue coloration. When dissolved in conc. sulfuric acid it is almost colorless, but on addition of small quantities of paraformaldehyde a greenblue coloration will be produced.

The new dyestuff dyes wool, silk and other animal and artificial fibres, such for example as nylon, in beautiful blue shades of excellent fastness properties to light, to washing and to perspiration and of good fulling fastness properties.

A similar dyestuff will be obtained, when using, instead of the potassium salt of the 1-amino-4-bromanthraquinone-2:5-disulfonic acid the corresponding 2:6-, 2:7- or 2:8-disulfonic acid.

*Example 4*

15 parts of the sodium salt of 1-amino-4-bromanthraquinone-2:7-disulfonic acid, 15 parts of p-benzoyl-methylamino-m-chloraniline, 10 parts of sodium bicarbonate, 0.1 part of copper bronze and 0.3 part of cuprous chloride are suspended in 50 parts of alcohol and 150 parts of water and the mass heated under stirring to 70° C. for 6 hours.

The blue condensation mass is worked up in the usual manner, whereupon, after drying, a blue dyestuff powder soluble in water with a vivid blue coloration will be obtained. When dissolved in conc. sulfuric acid an almost colorless solution will result, but on addition of small quantities of paraformaldehyde this solution becomes greenblue.

The new dyestuff dyes wool, silk and other animal fibres as well as artificial fibres, e. g. nylon, in beautiful blue shades of very good light-, washing- and perspiration-fastness properties and of good fulling fastness properties.

A similar dyestuff can be produced, when substituting the 2:5-, 2:6- or 2:8-disulfonic acid for the sodium salt of the 1-amino-4-bromanthraquinone-2:7-disulfonic acid.

*Example 5*

15 parts of the potassium salt of 1-amino-4-bromanthraquinone-2:5-disulfonic acid, 13 parts of m-(3'-chlorobenzoyl-methylamino)-aniline, 8 parts of sodium bicarbonate and 0.2 part of copper bronze are suspended in 50 parts of alcohol and 150 parts of water and the mass is heated under stirring for 6 hours to 80° C.

The condensation mass having become blue is worked up in the usual way, thus producing, after drying, a blue dyestuff powder dissolving in water with a vivid blue coloration. When dissolved in conc. sulfuric acid it is almost colorless, but on addition of small quantities of paraformaldehyde the colorless solution becomes green-blue.

The new dyestuff dyes wool, silk and other animal as well as artificial fibres, e. g. nylon, in beautiful blue shades. The resulting dyeings are distinguished by excellent fastness properties to light, washing and to perspiration and by a good fulling fastness.

A similar dyestuff can be obtained, if, instead of the potassium salt of 1-amino-4-bromanthraquinone-2:5-disulfonic acid, the 2:6-, 2:7- or 2:8-isomeric compound is used.

*Example 6*

14 parts of the sodium salt of 1-amino-4-bromanthraquinone-2:6-disulfonic acid, 12 parts of p-benzoyl-ethylaminoaniline, 10 parts of sodium bicarbonate, 0.1 part of copper bronze and 0.3 part of copper sulfate are suspended in 250 parts of water and the mass is heated, while stirring, for 6 hours to 70° C.

The blue condensation mass is worked up in the usual manner, thus giving, after drying, a blue dyestuff powder dissolving in water with a vivid blue coloration. Its solution in conc. sulfuric acid is almost colorless, but on addition of small quantities of paraformaldehyde the solution turns to green-blue.

The new dyestuff dyes wool, silk and other animal fibres as well as artificial fibres, such as nylon, in beautiful blue shades, the resultant dyeings being distinguished by very good fastness properties to light, to washing and to perspiration and by a good fulling fastness.

A similar dyestuff will be obtained, when using the corresponding 2:5-, 2:7- or 2:8-disulfonic acid instead of the sodium salt of 1-amino-4-bromanthraquinone-2:6-disulfonic acid.

Example 7

16 parts of the sodium salt of 1-amino-4-bromanthraquinone-2:7-disulfonic acid, 16 parts of p-(3'-toluyl-butylamino)-aniline, 10 parts of sodium bicarbonate, 0.1 part of copper bronze and 0.3 part of cuprous chloride are suspended in 50 parts of alcohol and 150 parts of water and the mass is heated under stirring for 6 hours to 70° C.

The blue condensation mass is worked up in the usual manner and gives, after drying, a blue dyestuff powder being soluble in water with a vivid blue coloration. Its solution in conc. sulfuric acid is almost colorless, but on addition of small quantities of paraformaldehyde the said solution becomes green-blue.

The new dyestuff dyes wool, silk and other animal fibres as well as artificial fibres, such as for instance nylon, in beautiful blue shades. The dyeings are distinguished by very good fastness properties to light, washing and to perspiration and by good fulling fastness properties.

A similar dyestuff will be obtained, by using, instead of the sodium salt of 1-amino-4-bromanthraquinone-2:7-disulfonic acid, the corresponding 2:5-, 2:6- or 2:8-disulfonic acid.

A similar dyestuff with similar properties will be obtained by substituting 18 parts of p-[(2'-, 3'- or 4'-phenyl-benzoyl)-methyl-, ethyl-, propyl- or butylamino]-aniline for 16 parts of p-(3'-toluyl-butylamino)-aniline.

Example 8

13 parts of the potassium salt of 1-amino-2:4-dibromanthraquinone-8-sulfonic acid, 13 parts of p-benzoylaminoaniline, 10 parts of sodium bicarbonate, 0.1 part of copper bronze and 0.3 part of cuprous chloride are suspended in 60 parts of alcohol and 300 parts of water, whereupon the mixture is heated to 70° C. under stirring, until the mass has become blue. Then it is worked up in the usual way and subsequently treated with alkali sulfite, preferably under pressure, in order to replace the bromine atom present in 2-position by a sulfo group. In this way a blue dyestuff powder will be obtained which dissolves in water with a vivid greenish-blue coloration. When dissolved in conc. sulfuric acid an almost colorless solution will be obtained, which on addition of small quantities of paraformaldehyde turns to blue-green.

The new dyestuff dyes wool, silk and other animal fibres as well as artificial fibres, such as for example nylon, in beautiful greenish-blue shades of very good light-, washing- and perspiration fastness properties and of a good fulling fastness.

A similar dyestuff will be obtained, if, instead of potassium-1-amino-2:4-dibromanthraquinone-8-sulfonate, the potassium or sodium salt of the corresponding 5-, 6- or 7-sulfonic acid is used.

Example 9

8.1 parts of sodium salt of 1-amino-4-bromanthraquinone-2-sulfonic acid, 10.6 parts of p-benzoylaminoaniline, 10 parts of sodium bicarbonate, 0.1 part of copper bronze and 0.3 part of cuprous chloride are suspended in 200 parts of water and heated under stirring for 3 hours to 70° C.

The blue condensation mass is worked up in the usual manner, whereupon, after drying, a blue dyestuff is obtained which is soluble in water with a vivid greenish-blue coloration. The solution in conc. sulfuric acid is blue-green and turns to grass-green on addition of small quantities of paraformaldehyde.

The new dyestuff dyes wool, silk and other animal fibres as well as artificial fibres, such as nylon, in beautiful greenish-blue shades. The dyeings are very fast to light, to washing and to perspiration and possess a satisfactory fulling fastness.

Example 10

8.4 parts of the potassium salt of 1-amino-4-bromanthraquinone-2-sulfonic acid, 12 parts of p-benzoylamino-m-toluidine, 8 parts of sodium bicarbonate and 0.4 part of cuprous chloride are suspended in 300 parts of water and heated under stirring to 70° C. for 3 hours.

The blue condensation mass is worked up in the usual way and dried, whereupon a blue dyestuff powder is obtained which is soluble in water with a vivid blue coloration. Its solution in conc. sulfuric acid possesses a blue-green coloration, which, on addition of small quantities of paraformaldehye, turns to grass-green.

The new dyestuff dyes wool, silk and other animal as well as artificial fibres, such as e. g. nylon, in beautiful blue shades of very good fastness properties to light, to washing and to perspiration and of a good fulling fastness.

Example 11

8.4 parts of the potassium salt of 1-amino-4-bromanthraquinone-2-sulfonic acid, 9 parts of p-benzoyl-methyl-amino-aniline, 10 parts of sodium bicarbonate, 0.1 part of copper bronze and 0.3 part of cuprous chloride are suspended in 50 parts of alcohol and 250 parts of water and heated, while stirring, to 70° C. for 6 hours.

The condensation mass having become blue is worked up in the usual way and dried. In this way a blue dyestuff powder is obtained which dissolves in water with a vivid blue coloration. When dissolved in conc. sulfuric acid the color of the solution is blue-green, while on addition of small quantities of paraformaldehyde the said color changes to grass-green.

The new dyestuff dyes wool, silk and other animal fibres as well as artificial fibres, e. g. nylon, in beautiful blue shades. The dyeings are distinguished by excellent fastness properties to light, to washing and to perspiration and by a good fulling fastness.

Example 12

8.1 parts of the sodium salt of 1-amino-4-bromanthraquinone-2-sulfonic acid, 15 parts of p-benzoylmethyl-amino-m-chloraniline, 12 parts of sodium bicarbonate and 0.3 part of copper bronze are suspended in 300 parts of water and the mass is heated, while stirring, for 6 hours to 70° C.

The blue condensation mass is worked up in the usual way and dried, whereupon a blue dyestuff powder which is soluble in water with a vivid blue coloration will be obtained. When dissolved in conc. sulfuric acid this dyestuff gives a blue-green coloration, whereas, on addition of small quantities of paraformaldehyde, the said color changes to grass-green.

The new dyestuff dyes wool, silk and other animal fibres as well as artificial fibres, e. g. nylon, in beautiful blue shades of excellent fastness properties to light, washing and to perspiration and of a good fulling fastness.

Example 13

8.4 parts of the potassium salt of 1-amino-4-bromanthraquinone-2-sulfonic acid, 13 parts of m-(3'-chlorobenzoyl-methylamino)-aniline, 8 parts of sodium bicarbonate, 0.2 part of copper bronze and 0.1 part of copper sulfate are suspended in 50 parts of alcohol and 250 parts of water and the mass heated, while stirring, for 6 hours to 80° C.

The blue condensation mass is worked up in the usual manner and gives, after drying, a blue dyestuff powder which is soluble in water with a vivid blue coloration. The solution in conc. sulfuric acid shows a blue-green coloration which, on addition of small quantities of paraformaldehyde, changes to grass-green.

The new dyestuff dyes wool, silk and other animal fibres as well as artificial fibres, e. g. nylon, in beautiful blue shades. The dyeings are distinguished by very good fastness properties to light, to washing and to perspiration and by a good fulling fatness.

Example 14

8.1 parts of the sodium salt of 1-amino-4-bromanthraquinone-2-sulfonic acid, 12 parts of p-benzoylethyl-amino-aniline, 10 parts of sodium bicarbonate and 0.3 part of copper bronze are suspended in 250 parts of water and the mass heated, while stirring, for 6 hours to 70° C.

The blue condensation mass is worked up in the usual manner and dried, whereupon a blue dyestuff powder dissolving in water with a vivid blue coloration will be obtained. When dissolved in conc. sulfuric acid, the solution becomes blue-green and on addition of small quantities of paraformaldehyde this color is changed to grass-green.

The new dyestuff dyes wool, silk and other animal as well as artificial fibres, such as for instance nylon, in beautiful blue shades. The produced dyeings are distinguished by excellent fastness properties to light, to washing and to perspiration and by a good fulling fastness.

Example 15

8.1 parts of the sodium salt of 1-amino-4-bromanthraquinone-2-sulfonic acid, 16 parts of m-(3'-toluyl-butylamino)-aniline, 6 parts of sodium bicarbonate and 0.2 part of cuprous chloride are suspended in 50 parts of alcohol and 200 parts of water and the mass is heated under stirring for 6 hours to 70° C.

The blue condensation mass is worked up and dried in the usual manner and gives a blue dyestuff powder which is soluble in water with a vivid blue coloration. Its solution in conc. sulfuric acid is blue-green and is converted to grass-green on addition of small quantities of paraformaldehyde.

The new dyestuff dyes wool, silk and other animal fibres as well as artificial fibres, e. g. nylon, in beautiful blue shades. The dyeings are distinguished by very good fastness properties to light, to washing and to perspiration and by a good fulling fastness.

A dyestuff having similar properties will be obtained, if, instead of 16 parts of m-(3'-toluyl-butylamino)-aniline, 18 parts of m- or p-[(2'-, 3'- or 4'-phenylbenzoyl)-methyl-, ethyl-, -propyl- or -butyl-amino]-aniline are used.

Example 16

7.6 parts of 1-amino-2:4-dibromanthraquinone, 30 parts of p-benzoylaminoaniline, 3 parts of anhydrous potassium acetate and 0.3 part of copper sulfate are heated, while stirring, to 130-140° C., until the mass has become blue. Then it is worked up in the usual manner and treated with alkali sulfite, preferably under pressure, in order to replace the bromine atom present in the 2-position by a sulfo group. A blue dyestuff powder is thus obtained which is soluble in water with a vivid greenish-blue coloration. The solution in conc. sulfuric acid is blue-green, but is converted to grass-green on addition of small quantities of paraformaldehyde.

The new dyestuff dyes wool, silk and other animal fibres as well as artificial fibres, e. g. nylon, in beautiful greenish-blue shades of very good fastness properties to light, to washing and to perspiration and of a good fulling fastness.

Example 17

8.4 parts of the potassium salt of 1-amino-4-bromanthraquinone-2-sulfonic acid, 6 parts of 1-N-methylamino-3-aminobenzene, 4.8 parts of sodium bicarbonate and 0.3 part of cuprous chloride are suspended in 200 parts of water and, while stirring, heated for 3 hours to 70° C.

The blue condensation mass is worked up in the usual manner, then digested at 40° C. in 200 parts of water containing 6 parts of 3-chlorobenzoylchloride, until the color of the slightly alkaline to neutral solution has changed to reddish-blue. Thus, a blue dyestuff powder dissolving in water with a blue coloration is produced. When dissolved in conc. sulfuric acid, a blue-green solution will result, its color changing to grass-green on addition of small quantities of paraformaldehyde.

The new dyestuff dyes wool, silk and other animal as well as artificial fibres, e. g. nylon, in beautiful blue shades. The dyeings are distinguished by excellent fastness properties to light, to washing and to perspiration and by a good fulling fastness.

The aroylation can also be carried out by means of 3-chlorobenzoylbromide, while as solvent for the aroylation for instance pyridine can also be used.

The same dyestuff will be obtained, if 1-amino-2:4-dibromanthraquinone is condensed with 1-N-methylamino-3-aminobenzene and the reaction product is treated either before or after the aroylation with alkali sulfite, preferably under pressure.

Example 18

15 parts of the potassium salt of 1-amino-4-bromanthraquinone-2:6-disulfonic acid, 10 parts of 1-N-ethylamino-4-aminobenzene, 4 parts of sodium bicarbonate and 0.3 part of cuprous chloride are suspended in 200 parts of water and, while stirring, heated for 3 hours to 70° C.

The blue condensation mass is worked up in the usual manner, then digested at 40° C. in 200 parts of water with 6 parts of 4-chlorobenzoylchloride, until the color of the slightly alkaline to neutral solution has changed to reddish-blue. A blue dyestuff powder which is soluble in water with a blue coloration is thus obtained. If this dyestuff is dissolved in conc. sulfuric acid, the resultant solution is colorless, but, on addition of some paraformaldehyde, it becomes blue-green colored.

The new dyestuff dyes wool, silk and other animal fibres as well as artificial fibres, e. g. nylon, in beautiful blue shades. The resultant dyeings are distinguished by very good fastness properties to light, to washing and to perspiration; besides the same possess good fastness properties to fulling.

The aroylation can be carried out also by means of 4-chlorobenzoylbromide. As solvent for the aroylation for instance pyridine is also a suitable one.

The same dyestuff will be obtained by condensing the potassium or sodium salt of 1-amino-2:4-dibromanthraquinone-6-sulfonic acid or the free acid thereof with 1-N-ethylamino-4-aminobenzene and the reaction product is treated with alkali sulfite either before or after the aroylation and preferably under pressure.

Similar dyestuffs can be obtained by using, instead of 1-amino-4-bromanthraquinone-2:6-disulfonic acid, the corresponding 2:5-, 2:7- or 2:8-disulfonic acid or, instead of 1-amino-2:4-dibromanthraquinone-6-sulfonic acid, the corresponding 5-, 7- or 8-sulfonic acid.

What we claim is:

1. A process for the manufacture of a new dyestuff of the anthraquinone series corresponding to the formula

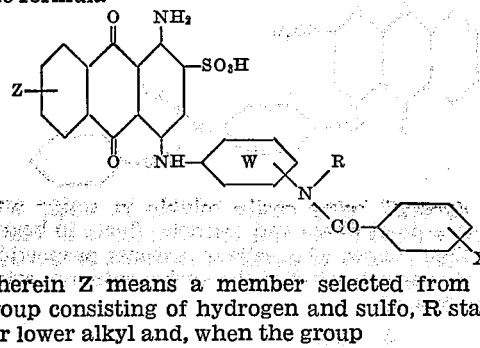

wherein Z means a member selected from the group consisting of hydrogen and sulfo, R stands for lower alkyl and, when the group

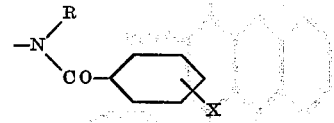

is linked to the benzene nucleus W in m-position, for a member selected from the group consisting of lower alkyl and hydrogen, and wherein X stands for a member selected from the group consisting of hydrogen, methyl and chlorine, comprising the step of condensing an anthraquinone compound of the formula

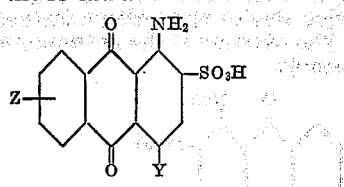

wherein Y means halogen and Z stands for a member selected from the group consisting of hydrogen and sulfo, with an aromatic amine corresponding to the formula

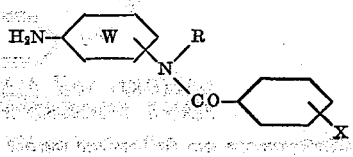

wherein R stands for lower alkyl and, when the group

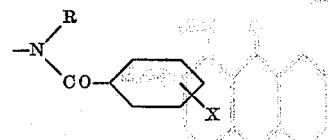

is linked to the benzene nucleus W in m-position, for a member selected from the group consisting of lower alkyl and hydrogen and X denotes a member selected from the group consisting of hydrogen, methyl and chlorine, in the presence of an acid binding agent and a catalyst chosen from the group consisting of copper, cuprous and copper salts.

2. A process for the manufacture of a new dyestuff of the anthraquinone series of the following formula

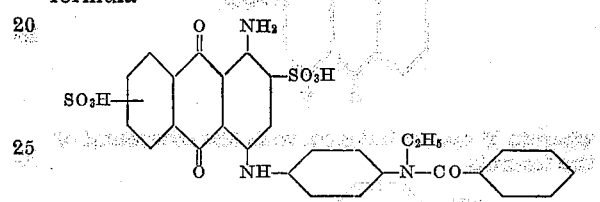

comprising the step of condensing a compound of the formula

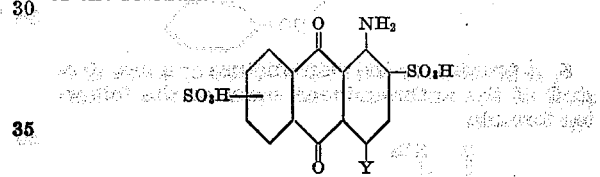

wherein Y means halogen, with the compound of the formula

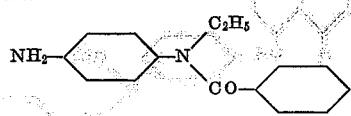

3. A process for the manufacture of a new dyestuff of the anthraquinone series of the following formula

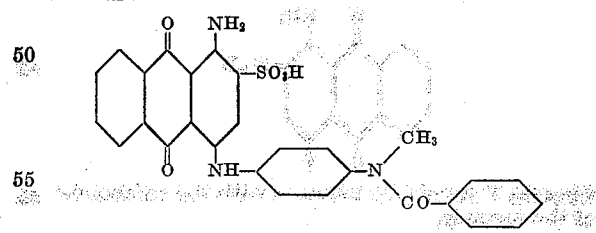

comprising the step of condensing a compound of the formula

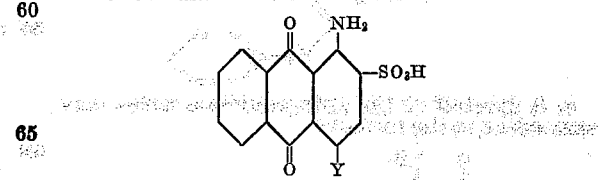

wherein Y means halogen, with the compound of the formula

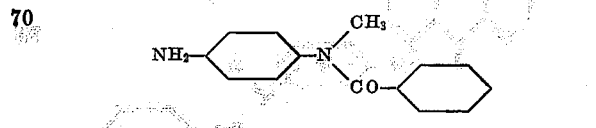

4. A process for the manufacture of a new dyestuff of the anthraquinone series of the following formula

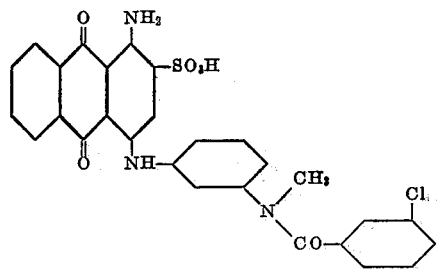

comprising the step of condensation of a compound of the formula

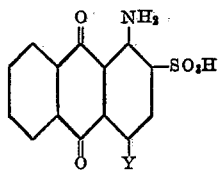

wherein Y means halogen, with the compound of the formula

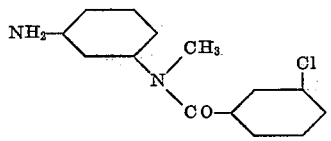

5. A process for the manufacture of a new dyestuff of the anthraquinone series of the following formula

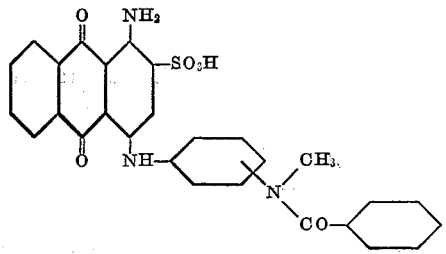

comprising the step of condensing a compound of the formula

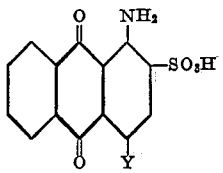

wherein Y stands for halogen, with the compound of the formula

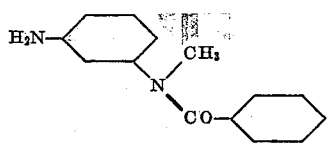

6. A dyestuff of the anthraquinone series, corresponding to the formula

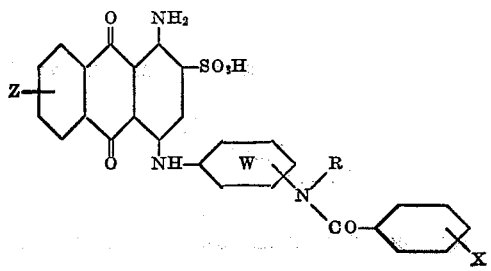

wherein Z means a member selected from the group consisting of hydrogen and sulfo, R stands for lower alkyl and, when the group

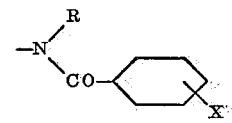

is linked to the benzene nucleus W in m-position, for a member selected from the group consisting of lower alkyl and hydrogen, and wherein X stands for a member selected from the group consisting of hydrogen, methyl and chlorine.

7. The new dyestuff of the anthraquinone series of the formula

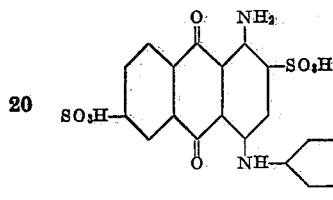

this dyestuff being easily soluble in water and dyeing animal fibres and artificial fibres in beautiful blue shades of excellent fastness properties.

8. The new dyestuff of the anthraquinone series of the formula

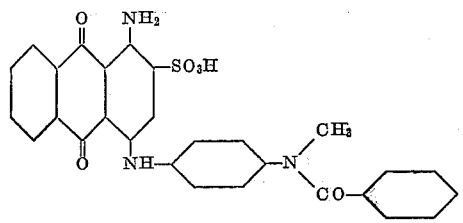

this dyestuff being easily soluble in water and dyeing animal fibres and artificial fibres in beautiful blue shades of excellent fastness properties.

9. The new dyestuff of the anthraquinone series of the formula

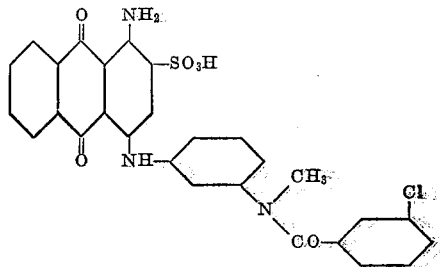

this dyestuff being easily soluble in water and dyeing animal fibres and artificial fibres in beautiful blue shades of excellent fastness properties.

10. The dyestuff of the anthraquinone series of the formula

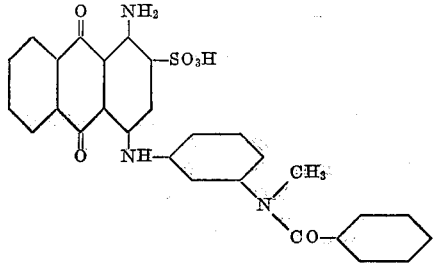

SAMUEL von ALLMEN.
HANS EGGENBERGER.

(References on following page)

REFERENCES CITED

The following references are of record in the file of this patent:

UNITED STATES PATENTS

| Number | Name | Date |
|---|---|---|
| 1,750,227 | Kranzlein et al. | Mar. 11, 1930 |
| 1,885,065 | Von Allmen | Oct. 25, 1932 |
| 1,927,125 | Kalischer et al. | Sept. 19, 1933 |
| 1,941,063 | Weinand et al. | Dec. 26, 1933 |

FOREIGN PATENTS

| Number | Country | Date |
|---|---|---|
| 521,800 | Great Britain | May 13, 1940 |